United States Patent
Vo

(10) Patent No.: US 6,970,712 B1
(45) Date of Patent: Nov. 29, 2005

(54) REAL TIME REPLAY SERVICE FOR COMMUNICATIONS NETWORK

(75) Inventor: Kiem-Phong Vo, Berkeley Heights, NJ (US)

(73) Assignee: AT&T Corp, New York, NY (US)

( * ) Notice: Subject to any disclaimer, the term of this patent is extended or adjusted under 35 U.S.C. 154(b) by 578 days.

(21) Appl. No.: 10/015,516

(22) Filed: Dec. 13, 2001

(51) Int. Cl.⁷ .............................................. H04B 7/00
(52) U.S. Cl. .................. 455/510; 455/412.1; 455/509; 455/514
(58) Field of Search ............................. 455/509, 510, 455/514, 13.1, 412, 456, 404, 412.1

(56) References Cited

U.S. PATENT DOCUMENTS

| | | | |
|---|---|---|---|
| 5,345,430 A | 9/1994 | Moe | |
| 5,477,487 A | 12/1995 | Greenberg | |
| 5,550,966 A * | 8/1996 | Drake et al. ............. | 707/104.1 |
| 6,014,693 A * | 1/2000 | Ito et al. ..................... | 709/219 |
| 6,029,063 A | 2/2000 | Parvulescu et al. | |
| 6,072,645 A | 6/2000 | Sprague | |
| 6,167,127 A | 12/2000 | Smith et al. | |
| 6,243,594 B1 | 6/2001 | Silberfenig | |
| 6,259,740 B1 | 7/2001 | Lyu | |
| 6,295,094 B1 | 9/2001 | Cuccia | |
| 6,317,165 B1 * | 11/2001 | Balram et al. ............. | 348/699 |
| 6,577,595 B1 * | 6/2003 | Counterman ................ | 370/230 |
| 2002/0075869 A1 * | 6/2002 | Shah et al. .................. | 370/389 |
| 2002/0160751 A1 * | 10/2002 | Sun et al. .................... | 455/412 |
| 2002/0199102 A1 * | 12/2002 | Carman et al. ............. | 713/168 |
| 2003/0040276 A1 * | 2/2003 | Corn ............................ | 455/42 |
| 2003/0114140 A1 * | 6/2003 | Iivonen et al. ............. | 455/406 |
| 2003/0114168 A1 * | 6/2003 | Shi et al. .................... | 455/456 |

* cited by examiner

Primary Examiner—Nick Corsaro
Assistant Examiner—Tan Trinh

(57) ABSTRACT

The present invention is a method and system for buffering and replaying a segment of a voice or data transmission. A connection is established between two end nodes in the network. At an intermediate node in the network between the end nodes, a predetermined segment of the data is maintained in a memory as a buffer. Upon receiving a request from one of the end nodes to replay the segment, that segment is replayed and transmitted to the requesting node. The request may be made by a user at one of the end nodes, or may be made automatically after detecting corrupt data. Because the buffering module is in the network, it need not be incorporated in premises or mobile equipment. Because the buffering module is remote from the requesting end node, the replayed data does not contain errors introduced in the original data between the buffering module and the requesting end node.

2 Claims, 6 Drawing Sheets

REAL TIME REPLAY SERVICE FOR COMMUNICATIONS NETWORK

FIELD OF THE INVENTION

The present invention relates generally to network communications services such as telephone services and data services, and, more particularly, to a method for providing a network-based, real-time replay service.

BACKGROUND OF THE INVENTION

A conversation is a forum in which participants attempt to transfer information in real time to one another via means such as voice, keyboards and wireless devices. Currently, communications networks are structured with the assumption that such transferred data are to be immediately consumed by the receiver(s). The data disappear after being delivered. Examples of conversations utilizing such communications networks include telephone calls, conference calls, electronic drawing boards and instant messaging.

Under field conditions, data transmission can be briefly interrupted or lost. In such cases, instant replay can be helpful to resynchronize the conversation. For example, during a conversation conducted via a telephone network, voice data can be corrupted by jitters on the network circuit or the data may be received but not properly processed because the listener was distracted by some external events (e.g., baby crying). In a wireless telephone communication, the data may have passed through most of the network intact, only to be corrupted by weather conditions between the wireless base station and the handset. Non-voice data may similarly be corrupted during transmission.

It is known to replay one-way streaming data such as TV transmission. For example, the digital video recording devices used in conjunction with TiVo, Inc.'s on-line service is capable of buffering viewed content for immediate replay. Similarly, many personal computer-based media players allow replay of streaming media such as video webcasts through the use of a buffering system. In each of those cases, the replay buffer is constructed at the receiving node of the network, using data received at that node. While useful in cases where the data is delivered intact to the receiving node, such devices are not useful if the data is corrupted upstream of the receiving node. Furthermore, the receiving party must purchase, install and activate a software and/or hardware device capable of buffering and replaying the signal.

The scroll-back feature of a terminal device, used in conjunction with instant messaging, provides some basic replay capability in the case of a conversation involving multiple parties. As with the buffering capability described above, that capability is not effective in replaying communications that have been corrupted upstream of the receiving node.

U.S. Pat. No. 5,477,487 describes a device that is used in conjunction with a receiver such as a car radio. The device has access to an audio signal produced by the receiver, and stores the audio signal in the form of a digital buffer that may be replayed by pressing a button. The buffer enables a listener, such as a distracted car driver, to replay a missed portion of the one-way broadcast. Again, the device is not useful if the broadcast was missed because it did not reach the receiver.

Users of cell phones, personal digital assistants (PDA's) and other mobile devices often encounter reception problems that arise in the final, wireless portion of the connection. A buffering system within the mobile device itself would not be helpful if a communication became garbled before reaching the mobile device. Because portability and compactness are important in such a device, it is furthermore undesirable to add to the device the components and circuitry necessary to implement a data buffering system.

It is therefore desirable to provide a method and apparatus for buffering information for replay on demand by the receiving party, wherein the replayed material is not affected by previous transmission errors upstream of the receiver, and no additional devices are necessary at the receiving node.

SUMMARY OF THE INVENTION

The present invention addresses those needs by providing a feature of the data transfer medium that continuously stores signals traveling through the network and replays them upon request.

One embodiment of the invention is a method of replaying a portion of a communication. In that method, a connection is initially established between first and second end nodes. At a buffering module in the connection remote from the first and second end nodes, a communications signal sent from the second end node to the first end node is received. A segment of that communications signal that was transmitted through the buffering module immediately previous to present time is maintained in a memory. At the buffering module, a request is received to retransmit at least a portion of the segment of the signal. That portion of the segment is then retransmitted from the buffering module to the first end node.

In that embodiment, at least a portion of the connection may be a PSTN, and the step of establishing a connection may include establishing a circuit-switched path. In that case, the request to retransmit may be a touch-tone sequence. The request to retransmit may be an in-band signal, or alternatively, an out-of-band signal.

The method may also include the step of receiving at the buffering module a request to begin maintaining in a memory a segment of the signal. That step permits a user to initiate buffering so that the replay service is available on demand.

At least a portion of the connection may be a packet switched network. In that case, the step of establishing a connection may include establishing a TCP/IP connection.

The communications signal may be a voice signal, in which case the segment of the signal is a time segment of the voice signal.

The connection may include an unreliable portion between the first node and the buffering module. The unreliable portion may be a wireless signal. The first node may, for example, be a premises telephone station set, a wireless telephone handset, or a PDA. The connection may include an audio bridge, in which case the segment of the signal maintained in memory is a segment of a signal sent by the audio bridge to listening station sets.

The method may also include the step of, after retransmitting the portion of the segment, transmitting the signal to the first end node beginning at a point immediately subsequent to the portion of the segment. Alternatively, the signal may be retransmitted beginning at a point in the signal received from the second node at present time.

The method may include storing a record of the retransmitting step in a message record accumulator.

The request to retransmit received at the buffering module may be automatically generated. Automatic generation of the signal may be triggered upon detection of corrupted data, and may be performed at the first node.

Another embodiment of the invention is a method for retransmitting a portion of a communication signal to an end node in a network having an unreliable link. In that embodiment, a segment of the communication transmitted immediately previous to present time is buffered at a location in the network on a side of the unreliable link opposite the end node. A request to retransmit at least a portion of the communication segment is received at that location, and the portion of the segment is retransmitted across the unreliable link to the end node.

These and other advantages of the invention will be apparent to those of ordinary skill in the art by reference to the following detailed description and the accompanying drawings.

DETAILED DESCRIPTION

Figure 1:
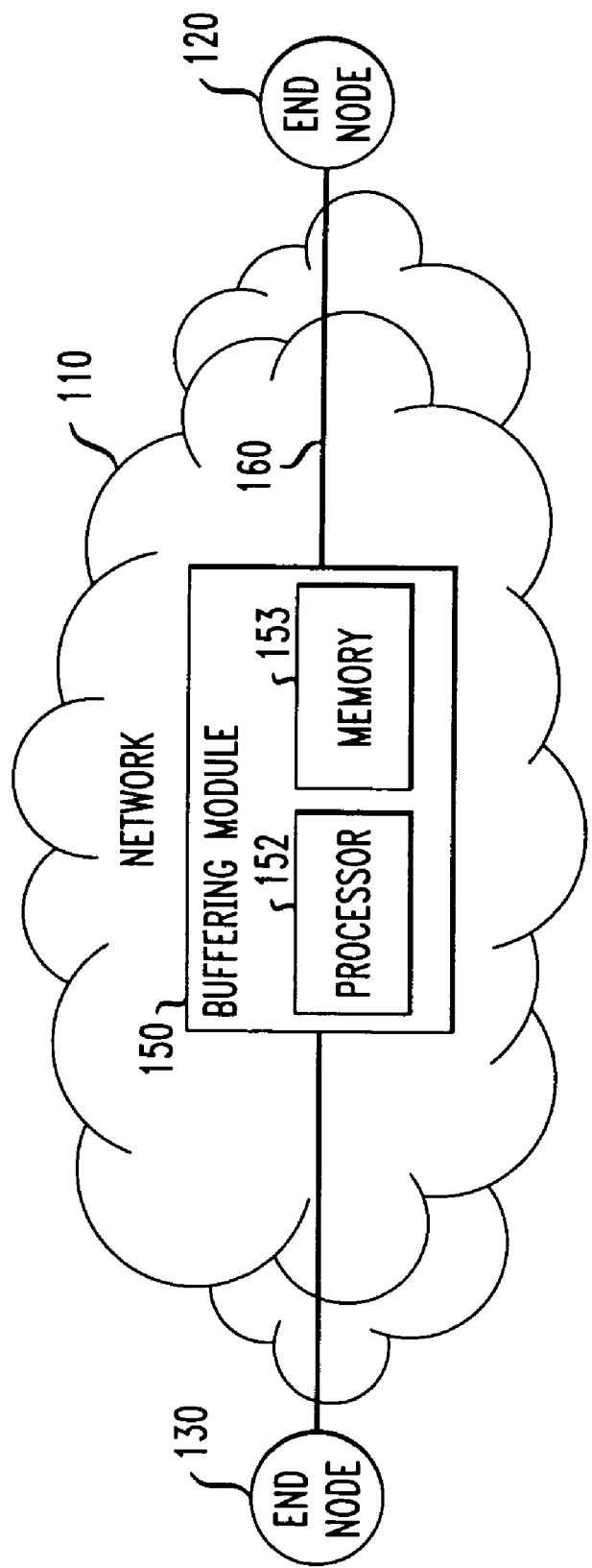
FIG. 1 is a network diagram illustrating one embodiment of the present invention.

An exemplary network 110 incorporating the invention is illustrated in FIG. 1. The network 110 may be a telephone network such as the Public Switched Telephone Network (PSTN), or any network in which a signal traveling through the network is available at some point as sequential information. The network connects two end nodes 120, 130 through a connection 160. The connection may be a dedicated connection between the two end nodes, or, as is conventional in a PSTN, a connection set up specifically for a conversation, and torn down after the conversation is terminated. The end nodes 120, 130 are nodes wherein a signal originates or terminates. A signal does not travel through an end node to other nodes in the network.

The network 110 includes a buffering module 150 that is an intermediate node within the connection 160. A signal traveling through the connection between the end nodes 120, 130 passes through the buffering module 150.

The buffering module 150 by virtue of its position has access to information passing through the connection 160. The buffering module 150 includes a processor 152 and a memory 153. The processor 152 may accept instructions regarding the operation of the buffering module, either through the network 110 or by other means. For example, the processor may be instructed to begin buffering data, to change the size of the data buffer, to replay a quantity of buffered data or to perform other similar operations.

In operation, the buffering module 150 stores in the memory 153 a segment of data passing through the connection 160 immediately previous to present time. In an exemplary embodiment, the memory 153 is a static or dynamic random access memory having a number of addresses in which to store data. The processor 152 receives the data from the connection 160 and writes the data to the memory 153 as it continuously cycles through the addresses. In that way, the address containing the oldest data in the memory 153 is always overwritten with the latest data from the connection. The number of addresses and the size of the addressable memory segments determine the storage capacity for buffered data. Where real-time voice data is buffered, the storage capacity determines the time interval represented by the buffer.

In a one embodiment of the buffering module 150, data is continuously read from cycled memory addresses, and transmitted along the connection 160 to a destination end node. When the buffering module is not replaying stored data, the data is read from an address immediately after it is written. To replay buffered information, the processor 152 stops writing data to the memory 153 while continuing to read data. When writing stops, data read from the cycled addresses will be the stored data starting with the oldest and progressing to the newest. The replayed data repeat as the addresses are cycled until writing is resumed. One skilled in the art will be aware of many other buffering schemes that may be used in the present invention without departing from the spirit thereof.

In a two-way conversation, the data stored in the buffer may include only data transmitted from the first end node to the second end node. In that case, there may be a separate buffer in the network for capturing data transmitted in the opposite direction. Where separate buffers are employed, replay may include only data transmitted in one direction, replayed from a single buffer, or may include two-way data by replaying both buffers simultaneously. Alternatively, the same buffer may be used to store data traveling in both directions; for example, all voice data in a two-way conversation may be stored in a single buffer.

Figure 2:
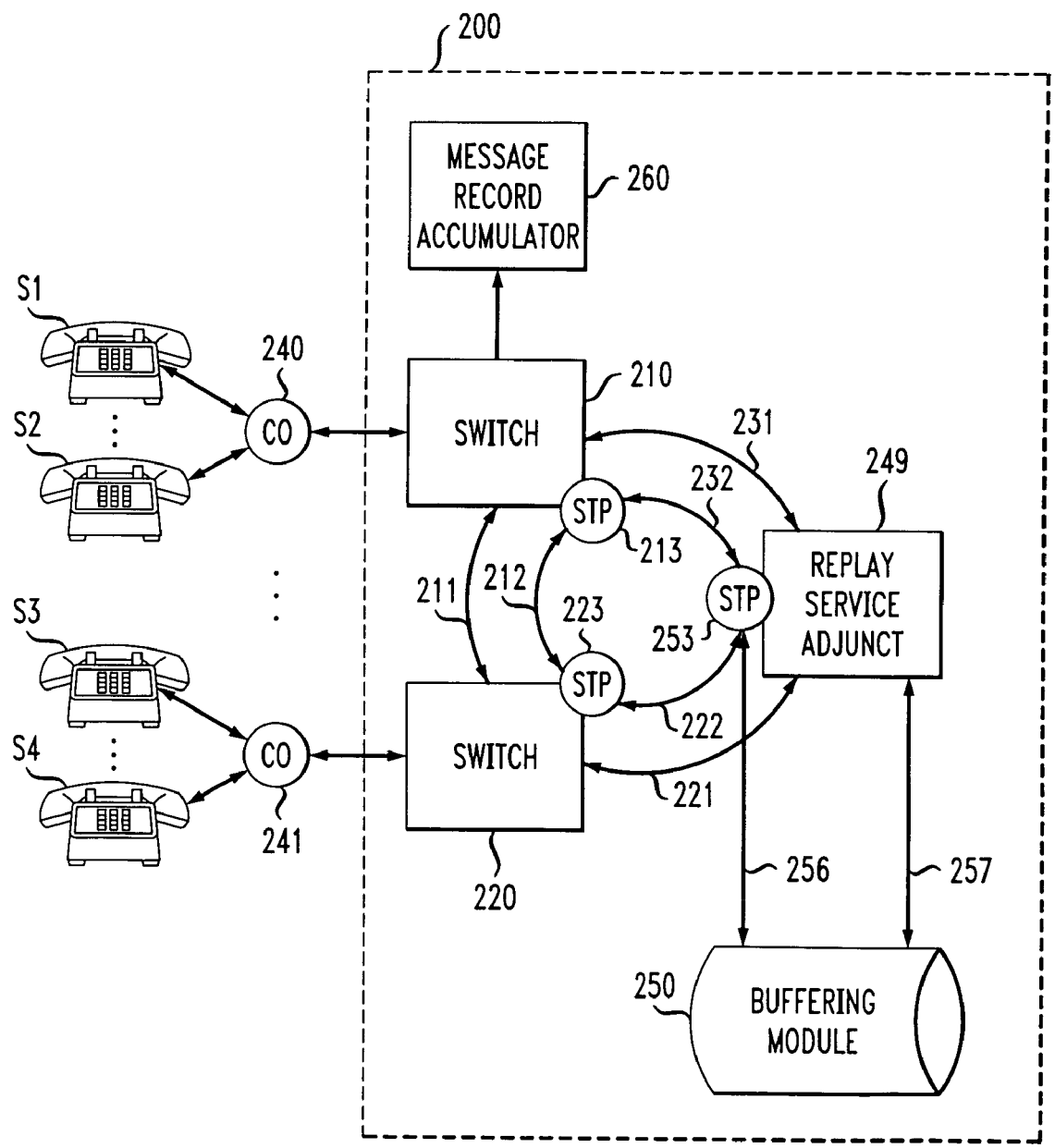
FIG. 2 is a network diagram including a PSTN illustrating one embodiment of the present invention.

An exemplary system for replaying real-time communications in accordance with the present invention is shown in FIG. 2. That system utilizes a PSTN 200, such as the well-known AT&T long distance telephone network. The network provides long distance telephone services for its subscribers, including the subscribers associated with telephone stations S1 through S4. The communications network 200 includes network switches such as switches 210, 220. In the exemplary embodiment, the switches 210, 220 are switching offices interconnected to each other and to other switching offices via a so-called inter-toll network; e.g., 211, 221, 231.

Each switch in the exemplary network is also connected to a number of central offices such as central offices 240, 241. The operation of a central office is well known and will not be discussed in detail herein. A central office is arranged to send to an associated switch of a network 200 a telephone call originated at a calling telephone station set (herein the calling party or the subscriber), e.g., S1, that has dialed a particular long distance telephone number. A central office is also arranged to connect to a telephone station set (herein the called party), e.g., S4, a call that the central office receives from an associated switch.

The network 200 preferably includes an out-of-band signaling system for setting up calls and for providing transaction and other capabilities for subscribers such as caller ID, call waiting and messaging services. The out-ofband signaling architecture includes signal transfer points (STP's) 213, 223, 253 that function as packet switches for routing signaling messages in the signaling system. The STP's are interconnected by a signaling system network 212, 222, 232. The out-of-band signaling system may also extend (not shown) to the central offices 240, 241 and subscriber stations sets S1–S4. A preferred example of an out-of-band signaling system is the ITU Signaling System 7 (SS7), which has been generally accepted by the telecommunications industry. SS7 protocol uses destination routing, octet-oriented fields, variable-length messages and a maximum message length allowing for 256 bytes of data.

Transactional message records of the network 200 are stored by a message record accumulator 260, connected to one or more network switches such as switch 210. The message record accumulator 260 collects relevant data, such as billing data, for each call connected over the network 200. The relevant data collected by the message record accumulator 260 is preferably a standardized message record that may be used by other elements of the network for purposes other than accessing a recording.

In a typical data recordation system used in a PSTN, relevant data such as billing data is recorded for each toll call, or connection, in a so-called automatic message account, or AMA, message record. Typical message record fields are the originating and terminating telephone numbers and elapsed time of call. The accumulator 260 of the present invention furthermore may have message record fields for recording use f the replay service of the invention. For example, the message record may include fields for recording that the service was used, for recording total replay time, etc. In a typical system, the message records, which are created for each call at a time substantially contemporaneous with the termination of the call, are transmitted from an originating switch to a message accumulation system such as accumulator 260. The latter distributes the accumulated messages to appropriate further processing systems that translate the AMA message records into the industry-standard "exchange message interface," or EMI, message record format. The EMI records are thereupon forwarded to a rating system that, inter alia, computes the toll charges applicable to the calls and adds an indication of those charges to the EMI record. The records thus formed are forwarded to a billing system in which they reside until processed to generate, typically, "hard copy" bills that are mailed to subscribers.

A replay service adjunct 249 is included in the communications network 200. The adjunct 249 operates, in accordance with the invention, to process calls to or from a party according to instructions received from the party. The replay service adjunct may send and receive voice signals via the inter-toll network 221, 231, and may also send and receive signaling messages via the out-or-band network 222, 232 and signal transfer point 253.

Associated with the replay service adjunct is buffering module 250 that is connected to the network via the recording service adjunct 249, as shown in FIG. 2, or via another switch such as switches 210, 220. The buffering module is capable of sending and receiving signals representing a voice telephone conversation or data transmission through an in-band network portion 257, and can also send and receive other messages related to the signal via an out-of band network portion 256. As previously discussed, the buffering module 250 includes a processor and memory.

In practice, two or more of the components including the replay service adjunct 249, the buffering module 250 and the message record accumulator 260 may be collocated at a common network node. It is furthermore likely that a plurality of each component would be deployed in a network.

Figure 3:
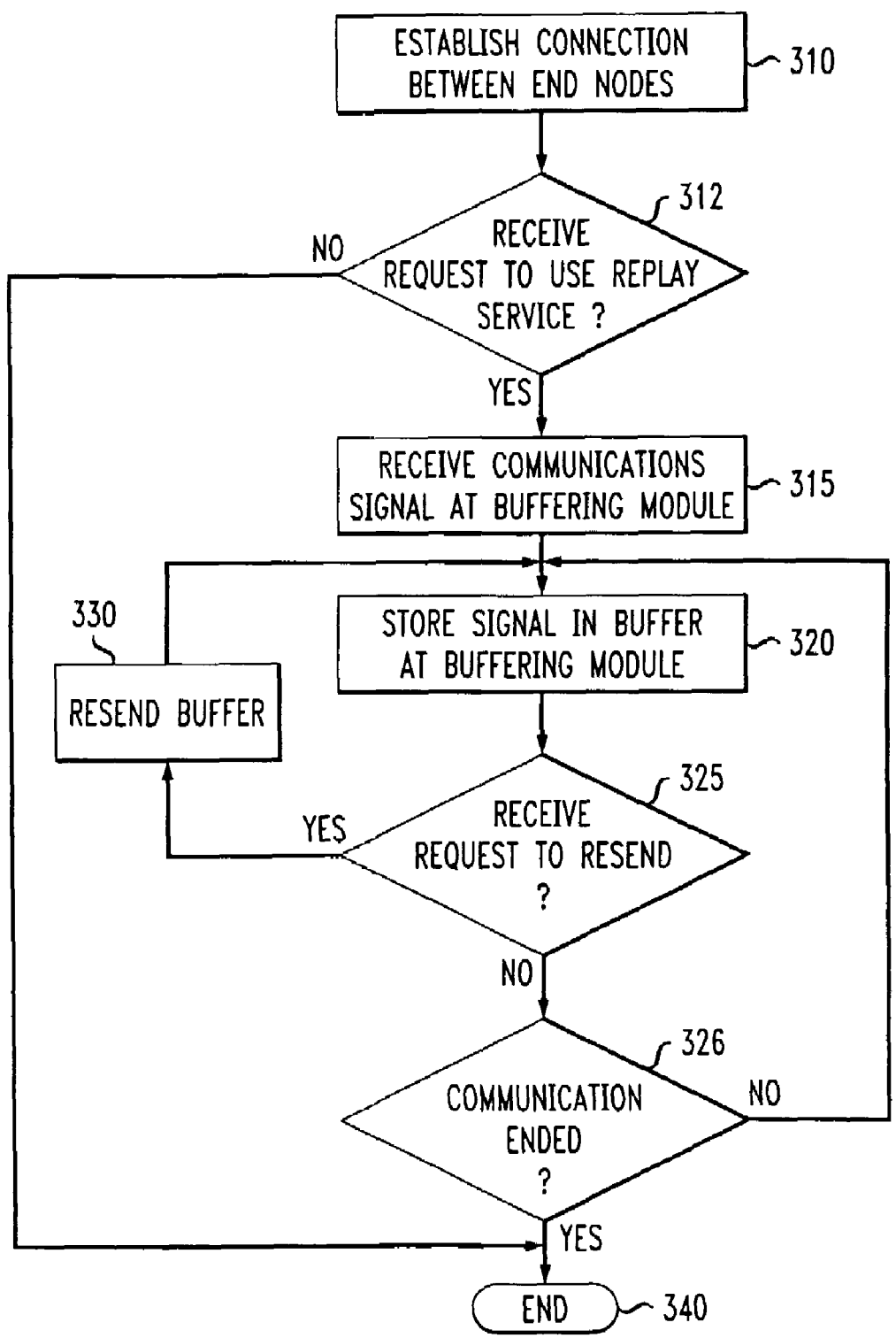
FIG. 3 is a flow chart illustrating one embodiment of the present invention.

In an exemplary method according to the invention, shown in FIG. 3, a connection is established between the first and second end nodes (step 310). The connection may be through any data transfer medium capable of carrying a communications signal. In the case of a PSTN, the connection is established by network switches such as switches 210, 220 and STP's such as STP's 213, 223, 253 of the network 200 (FIG. 2). The connection may alternatively be established via some combination of circuit switching and packet switching, and may include a circuit in the PSTN network and a TCP/IP connection in the Internet. The connection may further include, for example, a broadband phone, a wireless phone, a wireless data network, a cable modem, or an instant messaging module. The connection may be established for the purpose of transmitting a conventional two-party telephone conversation, a conference call, an electronic drawing board session or instant messaging.

The replay service of the invention may be enabled before or during a communication by receiving (step 312) a request to use the replay service. In that embodiment, buffer memory is not consumed unless a party intends to use the service. In another embodiment, no initial request is made to use the service, and instead all communications are buffered.

After a connection is established, a communication signal is transmitted between the end nodes. The signal is received (step 315) at a buffering module within the communications network. The signal is buffered (step 320) at the buffering module. As described above, the signal is buffered by storing a segment of the signal received at the buffering module immediately before present time. In the case of a voice transmission, the buffer may store a quantity of data received during a fixed time interval immediately previous to the present time, such as a 15-second interval. Alternatively, the buffer may store a fixed quantity of data, in which case the buffered time interval varies with the data transmission rate.

Once data is buffered, it is available for replaying and resending upon a request originating at one of the end nodes. A request is received (step 325) at the buffering module to resend the buffered data. The request may be simply a signal to resend the entire buffer, or may specify a portion of the buffer to be resent. For example, the request may identify a time interval during the buffered period that begins at time t and ends at time t+x, where x is the length of the requested time interval. In any case, the requested time interval for resending must fall within the buffered period.

The request to resend all or a portion of the buffer may be transmitted in-band to the buffering module through the network itself. In the exemplary PSTN, the request may be transmitted in the form of touch-tones; in a packet switched network, the request may be contained in a packet addressed to the buffering module or another node controlling the buffering module. The request may alternatively be transmitted to the buffering module out-of-band. For example, in the case of the PSTN illustrated in FIG. 2, the request to replay the buffer may be transmitted to the replay service adjunct 249 through the signaling system network 212, 222, 232.

Returning to the method of FIG. 3, if a request to resend is received, all or part of the buffer is resent (step 330) in response to the request. Resending the buffer includes replaying the requested portion of the buffer as described above, and directing the replayed data to another node. In the preferred embodiment, the data is directed to the node that requested that the communication be resent. Alternatively, the data may be directed to another location, such as permanent storage. Such an arrangement would, for example, permit a party to make a record of the buffered portion of a conversation for later use.

Figure 4:
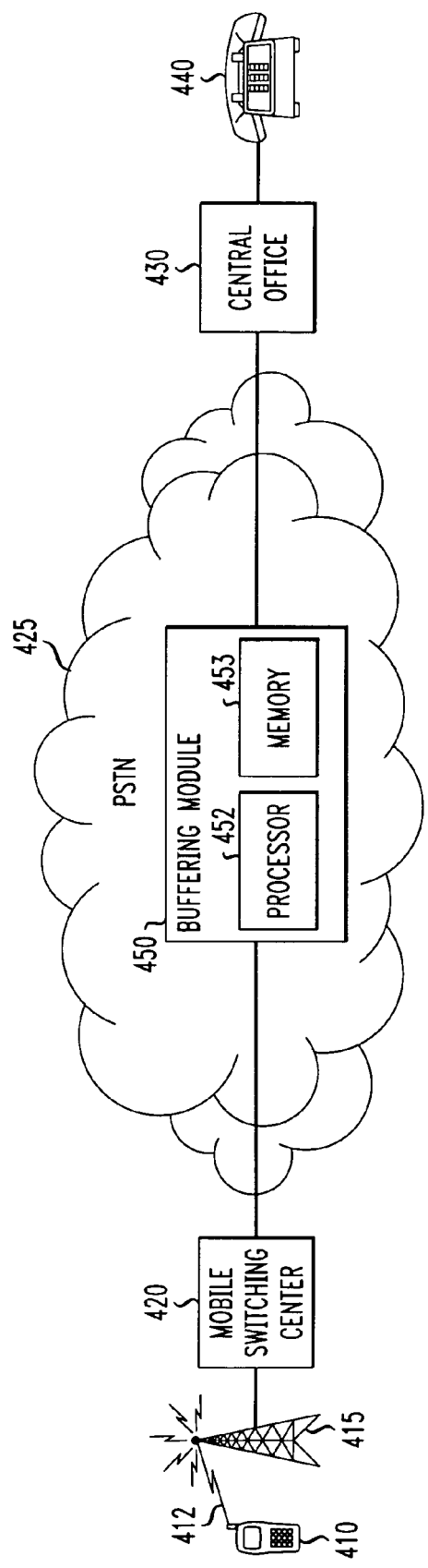
FIG. 4 is an example of a network diagram including a wireless telephone network illustrating another embodiment of the present invention.

One embodiment of the method and system of the present invention incorporates the buffering module with a mobile voice telephone system. As shown in FIG. 4, a wireless handset 410 and a station set 440 are linked through a connection including a wireless signal 412, a wireless base station 415, a mobile switching center 420, a PSTN 425, and a central office 430. A buffering module 450 is incorporated in the PSTN 425. As described above, the buffering modules 450 includes a processor 452 and a memory 453. One skilled in the art will recognize that the buffering module 450 may be incorporated within other components in the connection, such as nodes within the mobile switching center 420 or central office 430.

In the wireless telephone connection shown in FIG. 4, the mobile switching center 420, the central office 430 and the PSTN 425 are generally reliable portions of the connection, and are not likely to cause interruptions in communication requiring a replay of a portion of a conversation. The wireless signal 412, however, is frequently a source of transmission interruption, because it is susceptible to RF interference, weather, obstacles such as tunnels and buildings, etc. Because the buffering module 450 is within the reliable portion of the connection, and removed from the unreliable wireless signal 412, a party using the wireless handset 410 may replay portions of an incoming transmission that were not received due to such transmission interruptions. Advantageously, a transmission that does not reach the handset 410 intact nevertheless reaches the buffering module 450 and is therefore available for replay. Furthermore, buffering and replaying within the network does not necessitate additional equipment in the handset 410.

In one embodiment of the invention, error correction when communicating via noisy devices such as wireless telephones is performed automatically. In the example of a wireless telephone network, if the station set 440 transmits voice data correctly into the network but due to noise in the wireless connection 412, the handset 410 receives corrupted data, the handset 410 may detect the corrupted data without intervention by the user, and automatically request that the buffering module 450 resend the corrupted portion of the conversation.

Figure 5:
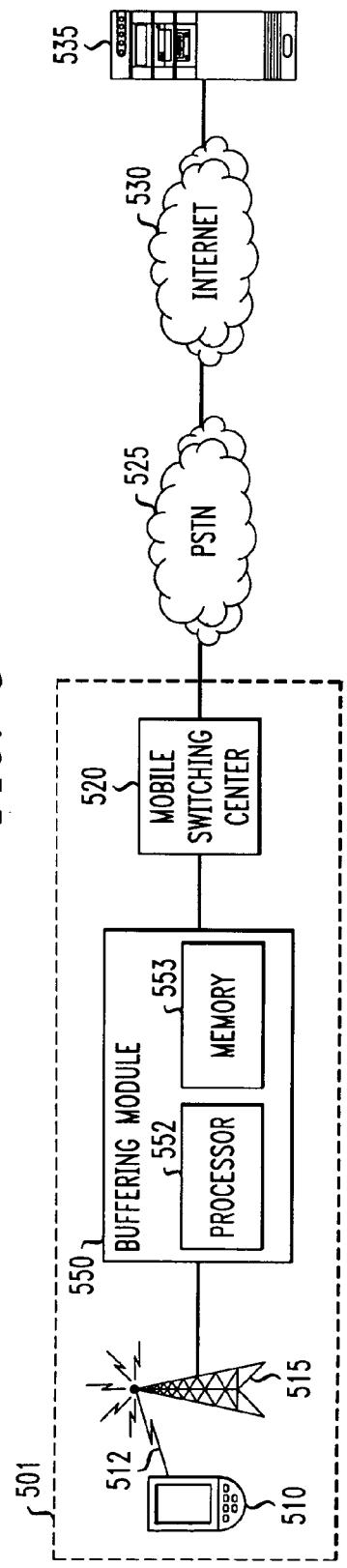
FIG. 5 is an example of a network diagram including a personal digital assistant and wireless network, illustrating one embodiment of the present invention.

In another embodiment of the invention, shown in FIG. 5, a mobile network terminal such as a personal digital assistant (PDA) 510 is connected to a server 535 through a connection including a wireless signal 512, a base station 515, a mobile switching center 520, a PSTN 525, and a public packet-switched network 530 such as the Internet. The PDA 510, the wireless signal 512, the base station 515 and the mobile switching center 520 comprise a wireless telephone network 501. Also incorporated in the wireless network 501 is a buffering module 550, which is positioned on the network side of the wireless signal 512. While shown between the mobile switching center 520 and the base station 515, the buffering module 550 may alternatively be placed within those elements or elsewhere in the connection on the network side of the wireless signal 512.

The PDA 510 is generally used to access information from the server 535 by making simple requests; for that reason, traffic flow from the server to the PDA is generally much heavier than traffic flow in the opposite direction. It is known in the art to verify data received by the PDA by checksum or other technique, and, if faulty data is detected, to request from the server another copy of the faulty data. The request, and the duplicate data, must travel the entire length of the connection, from the server 535 to the PDA 510. By placing the buffering module 550 at an intermediate node within the connection at or near the wireless network, data flowing to the PDA 510 may be retransmitted across a shorter portion of the connection that still includes the wireless connection 512 where transmission errors are most likely to occur. The wireless network 501 as a whole, including base station 515 and mobile switching center 520, is thereby made more reliable as a data transfer medium for transmitting data to the PDA 510, without further burdening other networks in the connection between the PDA and the server 535.

Figure 6:
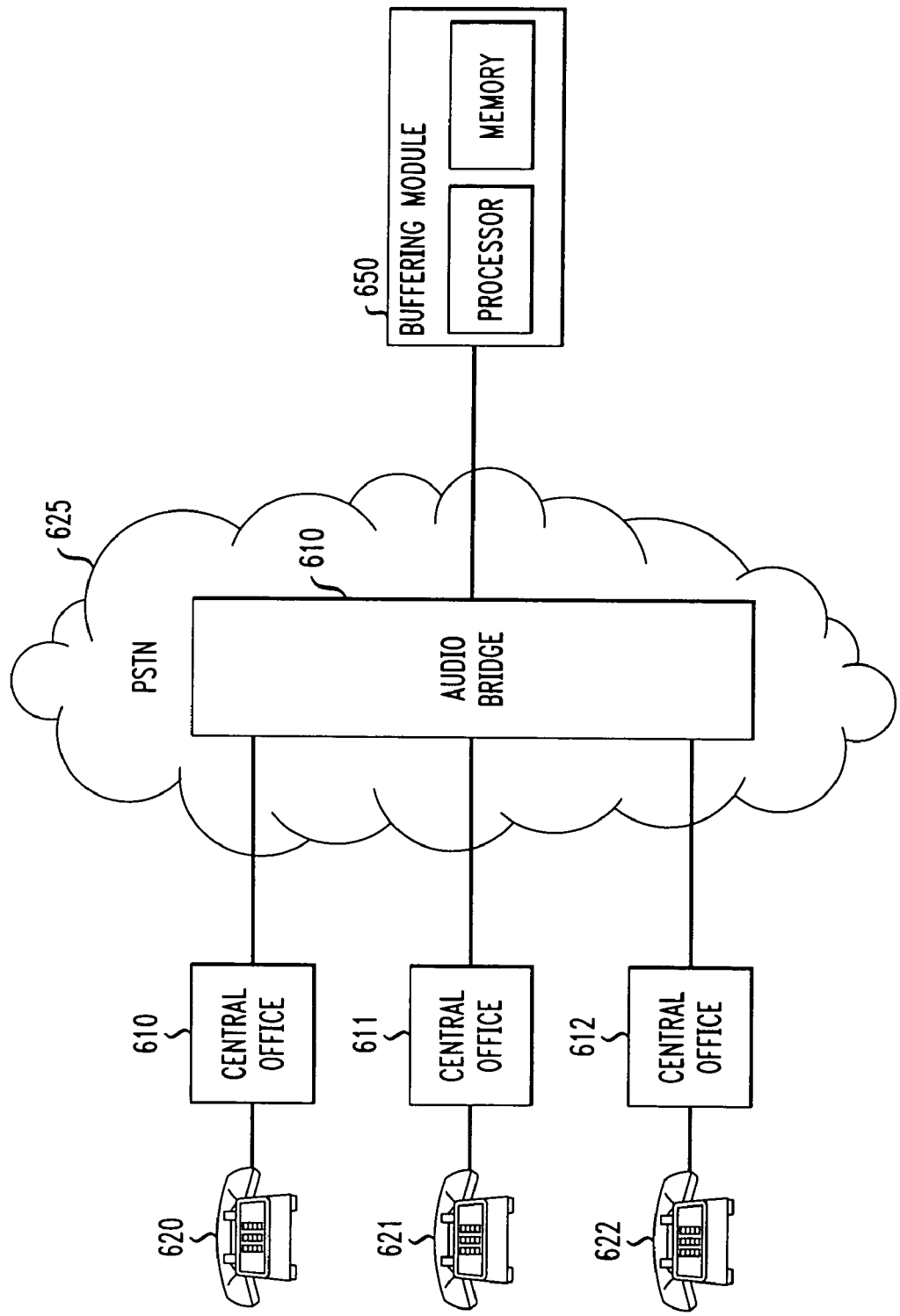
FIG. 6 is an example of a network diagram including an audio bridge for conference calls, illustrating one embodiment of the present invention.

In a conference call arrangement shown in FIG. 6, an audio bridge 610 receives transmissions from each of the station sets 620, 621, 622, that are connected to the bridge though central offices 610, 611, 612 and the PSTN 625. The audio bridge monitors transmissions from each station set participating in the conference, decides which station set user is speaking, and selectively transmits an outgoing signal from the speaking station set to the listening station sets.

A buffering module 650 is connected to the audio bridge 610 and receives all outgoing transmissions from the bridge. In that arrangement, any of the station sets 620, 621, 622 may request the buffering module 560 to replay a buffered portion of the conversation as it was transmitted to the listening station sets.

Figure 7:
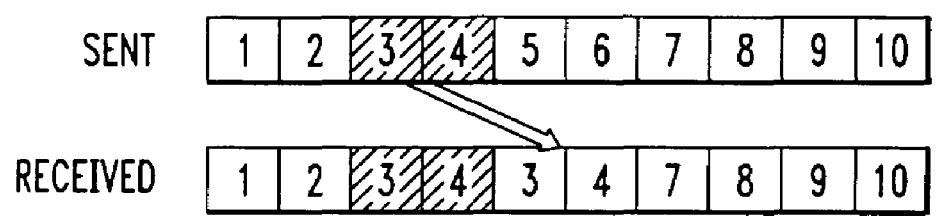
FIG. 7 is a timing diagram illustrating an embodiment of the present invention.

In the case of a voice communication, the replay of the communication segment may replace a subsequent segment of the original communication that was sent. As shown in FIG. 7, a communication sent from a source may include segments 1 through 10, but segments 3 and 4 are corrupted during transmission. The network resends those segments, and they are received during the time in which segments 5 and 6 would otherwise have been received. After segments 3 and 4 have been replayed, the receiver resumes receiving the communication as it is transmitted, starting with segment 7. In that arrangement, the receiver never receives segments 5 and 6. Such an arrangement is acceptable in voice transmissions, where the receiver may request that the sender stop talking while the segment is replayed.

Figure 8:
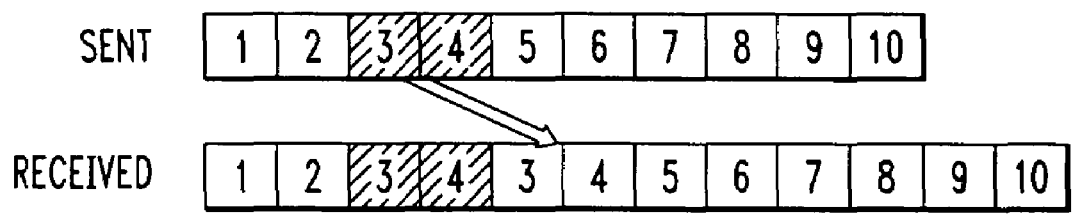
FIG. 8 is a timing diagram illustrating another embodiment of the present invention.

In the arrangement of FIG. 8, segments 5 and 6 are delayed by the buffer and are received by the receiver after segments 3 and 4 are replayed. Thereafter, subsequent segments are delayed by the network and delivered to the receiver in order. Because no data is lost in that arrangement, it is appropriate for data transfer as opposed to voice communications. The network, however, must either resynchronize by increasing the data transfer rate between the buffer and the receiver, or continuously buffer data until a communication is complete. In either case, at least temporarily, memory is consumed that would otherwise be available for replay buffering.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description has been described with particular emphasis on existing voice telephony and data network architecture. However, the principles of the present invention could be extended to other communications architecture, such as Internet telephony, facsimile, instant messaging or other data communications. Such an extension could be readily implemented by one of ordinary skill in the art given the above disclosure.

What is claimed is:

1. A method replaying a portion of a communication, comprising the steps of:

establishing a connection between first and second end nodes;

receiving, at a buffering module in the connection remote from the first and second end nodes, a communications signal sent from the second end node to the first end node;

maintaining in a memory a segment of the communications signal that was transmitted through the buffering module immediately previous to present time;

receiving at the buffering module a request to retransmit at least a portion of the segment of the signal;

retransmitting from the buffering module to the first end node the portion of the segment; and further comprising the step of, after retransmitting the portion of the segment, transmitting the signal to the first end node beginning at a point immediately subsequent to the portion of the segment.

2. A method replaying a portion of a communication, comprising the steps of:

establishing a connection between first and second end nodes;

receiving, at a buffering module in the connection remote from the first and second end nodes, a communications signal sent from the second end node to the first end node;

maintaining in a memory a segment of the communications signal that was transmitted through the buffering module immediately previous to present time;

receiving at the buffering module a reguest to retransmit at least a portion of the segment of the signal;

retransmitting from the buffering module to the first end node the portion of the segment; and after retransmitting the portion of the segment, transmitting the signal to the first end node beginning at a point in the signal received from the second node at present time.

* * * * *